United States Patent [19]

Kidd

[11] Patent Number: 4,733,527

[45] Date of Patent: Mar. 29, 1988

[54] CONSTANT $NO_x$ CONTROL FOR GAS TURBINE

[75] Inventor: Harry A. Kidd, Shinglehouse, Pa.

[73] Assignee: Dreser Industries, Inc., Dallas, Tex.

[21] Appl. No.: 24,817

[22] Filed: Mar. 12, 1987

[51] Int. Cl.$^4$ .............................. F02C 7/00; F02C 9/00
[52] U.S. Cl. ..................................... 60/39.05; 60/39.3; 60/39.55
[58] Field of Search .................... 60/39.05, 39.3, 39.53, 60/39.55, 39.58, 39.59

[56] References Cited

U.S. PATENT DOCUMENTS

| | | | |
|---|---|---|---|
| 3,021,673 | 2/1962 | Mock | 60/39.3 |
| 3,693,347 | 9/1972 | Kydd et al. | 60/39.3 |
| 4,160,362 | 7/1979 | Martens et al. | 60/39.3 |
| 4,259,837 | 4/1981 | Russell e al. | 60/39.55 |
| 4,667,465 | 5/1987 | Monk | 60/39.3 |

Primary Examiner—Louis J. Casaregola
Attorney, Agent, or Firm—Sigalos & Levine

[57] ABSTRACT

A method and apparatus for automatically maintaining gas turbine $NO_x$ emissions at a substantially constant level during all ambient conditions and for no load to full load fuel flows. The required water/fuel ratio is calculated for a substantially constant level of $NO_x$ emissions at the given operating conditions and, knowing the actual fuel flow to the gas turbine, a signal is generated representing the water metering valve position necessary to inject the proper water flow into the combustor to achieve the desired water/fuel ratio.

10 Claims, 6 Drawing Figures

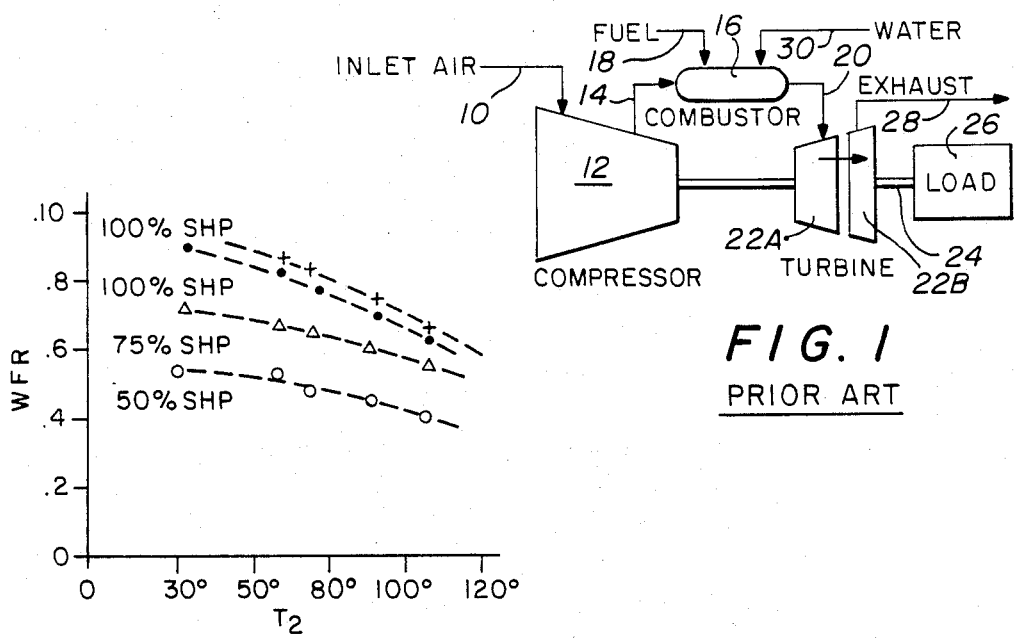
FIG. 1
PRIOR ART
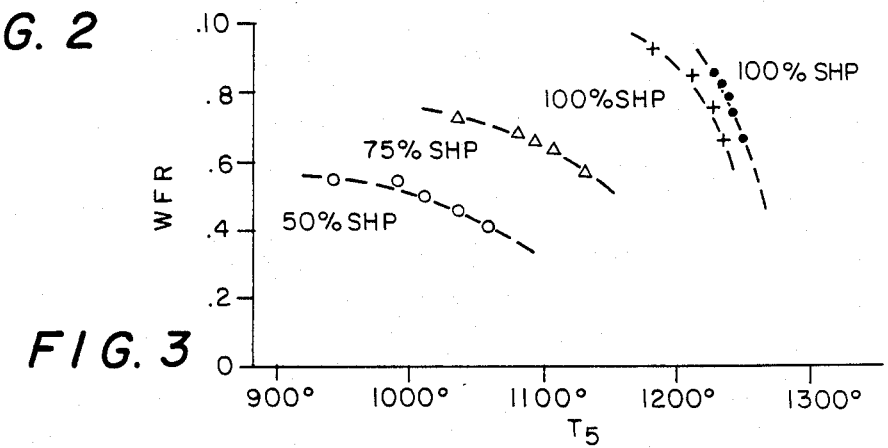
FIG. 2
FIG. 3
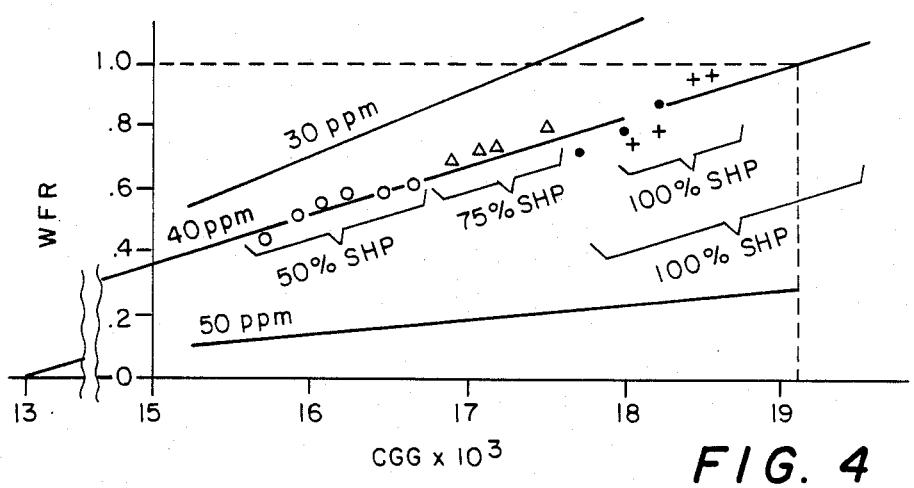
FIG. 4

CONSTANT NO$_x$ CONTROL FOR GAS TURBINE

BACKGROUND OF THE INVENTION

The present invention relates to a system for automatically maintaining gas turbine nitrogen oxide (NO$_x$) emissions at a specific level in parts per million by volume during all ambient conditions for no load to full load fuel flows. More particularly, the invention relates to a device and method for automatically adjusting the input water flow rate to the gas generator to maintain constant nitrogen oxide emissions substantially equal to or less than maximum permissible amounts.

Gas turbines are well-known in the art. They include a compressor which compresses the inlet air and transfers it to the combustor. The combustor has fuel added which when ignited, heats the compressed air and produces output gases which are then expanded across a turbine to provide the power output. The combustor burns fossil fuels such as natural gas, either in the gaseous or liquid state. Water is also added in the combustor to bring the combustor temperature down.

Because of the use of the fossil fuels as the combustor fuel, nitrogen oxide emissions (NO$_x$) are found in the exhaust gases. The gas turbines are designed to maintain a government imposed minimum level of NO$_x$ by utilizing water injection in the combustor which is added at the same time as the fuel. Water cools the combustor and reduces the temperature of the output gases which reduce NO$_x$ emissions. It is difficult to maintain constant NO$_x$ emissions because of variable operating conditions of the gas turbine such as inlet air temperature, turbine RPM and various loads on the turbine, all of which cause the system to operate so as to change the NO$_x$ emissions.

Some prior art systems attempt to use manually controlled water metering valves so that they can be manually adjusted to attempt to control the amount of water being used to obtain some optimum water/fuel ratio. However, as can be imagined, it is almost impossible to manually control the water/fuel ratio to provide the desired NO$_x$ emissions with continuously changing conditions such as inlet air temperature, turbine speed, and load applied to the turbine.

Other prior art gas turbines utilize constant flow water injectors to reduce combustor temperatures. These systems are designed for full horsepower operating level and provide proper NO$_x$ emission levels only at the full horsepower operating point. Operation under conditions other than the design conditions simply wastes water and decreases the operating efficiency of the turbine.

The present invention relates to a system for estimating the desired water/fuel ratio to provide a substantially constant NO$_x$ emission as a function of corrected turbine speed, inlet air temperature, load and the amount of fuel being consumed as determined by the fuel metering valve position. Tests have shown that there is no correlation between the water/fuel ratio and the gas generator compressor inlet temperature only or only the temperature of the combustion gases between the compressor and the power turbine. However, there is a linear correlation between the water/fuel ratio and the gas generator speed corrected for inlet air temperature to maintain NO$_x$ emissions at a minimum constant level. Thus it is well known that if the inlet air temperature T$_2$ is corrected by factor $$\theta = \frac{T_2 + 460}{519} \quad (1)$$

and the square root of that correction factor or ($\sqrt{\theta}$) is divided into the actual gas generator speed, AGG, a corrected gas generator speed, CGG, is obtained. Thus, $$CGG = \frac{AGG}{\sqrt{\theta}} \quad (2)$$

From this corrected gas generator speed, the desired water/fuel ratio is obtained as follows:

$$WFR = \frac{CGG - N_1}{N_2} + K \quad (3)$$

where WFR=the desired water/fuel ratio for substantially constant NO$_x$ emission, CGG=corrected gas generator speed, N$_1$=minimum corrected gas generator speed for WFR=0.0, N$_2$=(corrected gas generator speed for a water/fuel ratio=1.0)−N$_1$ and K=a constant. By multiplying the desired water/fuel ratio, $$WFR = \frac{W_w}{W_F},$$

obtained by this calculation times the fuel flow in pounds per hour, W$_F$, as determined by the fuel flow valve position, a signal may be obtained for adjusting the desired water flow valve position, W$_p$, to obtain the proper water flow, W$_w$. Thus, $$\frac{W_w}{W_F}(W_F) = W_w \quad (4)$$

Therefore, it is an object of the present invention to provide a gas turbine with substantially constant NO$_x$ emissions over variable inlet air temperatures, gas generator speeds and gas generator loads.

It is another object of the present invention to provide a gas generator with substantially constant NO$_x$ output emissions by using a variable water/fuel ratio by controlling the amount of water used depending upon the amount of fuel being used under variable inlet temperature and load conditions.

It is also an object of the present invention to determine the desired water/fuel ratio, determine the amount of fuel being utilized, multiply the desired water/fuel ratio times the amount of fuel being used to obtain the amount of water that should be used and then setting the water metering valve according to the amount of water desired to be used.

SUMMARY OF THE INVENTION

Thus the present invention relates to a system for automatically maintaining substantially constant nitrogen oxide emissions from a gas turbine burning a fossil fuel injected through a fuel input valve by injecting variable quantities of water in the combustor through a water input valve, the system comprising means for determining a corrected speed, CGG, of said gas turbine according to the formula $$CGG = \frac{AGG}{\sqrt{\theta}} \qquad (1)$$

where AGG=the actual rotational speed of said gas gas turbine, $$\theta = \frac{T_2 + 460}{519},$$

the gas turbine air inlet temperature correction factor and $T_2$=compressor inlet temperature, and means for varying the water/fuel ratio, WFR, by changing the volume of water input to the gas turbine with variation in load and said inlet temperature according to the formula $$WFR = \frac{CGG - N_1}{N_2} + K \qquad (2)$$

where $N_1$=minimum corrected gas turbine speed for WFR=0.0, and $N_2$=(corrected gas turbine speed for WFR=1.0)−$N_1$ and K=constant thereby maintaining substantially constant emissions of nitrogen oxide from said gas turbine.

The invention also relates to a method for automatically maintaining substantially constant nitrogen oxide emissions from a gas turbine burning a fossil fuel injected through a fuel input valve by injecting variable quantities of water in the combustor through a water input valve, the method comprising the steps of determining a corrected speed, CGG, of said gas turbine according to the formula $$CGG = \frac{AGG}{\sqrt{\theta}} \qquad (2)$$

where AGG equal the actual rotational speed of said gas turbine, $$\theta = \frac{T_2 + 460}{519},$$

the gas turbine air inlet temperature correction factor, and $T_2$=compressor inlet temperature and varying the water/fuel ratio, WFR, by changing the volume of water input to said gas turbine with variation in load and said inlet temperature according to the formula $$WFR = \frac{CGG - N_1}{N_2} + K \qquad (2)$$

where $N_1$=minimum corrected gas turbine speed for WFR=0.0 and $N_2$=(corrected gas turbine speed for WFR=1.0)−$N_1$ thereby maintaining substantially constant emissions of nitrogen oxides from said gas turbines.

BRIEF DESCRIPTION OF THE DRAWINGS

These and other objects of the present invention will be disclosed in conjunction with the accompanying drawings in which:

FIG. 1 is a schematic diagram of a prior art gas turbine;

FIG. 2 is a graph of the water/fuel ratio required to maintain a constant $NO_x$ level versus the gas turbine compressor inlet temperature, $T_2$, for varying loads;

FIG. 3 is a graph of the water/fuel ratio required to maintain a constant $NO_x$ level versus the temperature, $T_5$, of combustion gases between the two turbine stages for varying loads;

FIG. 4 is a graph of the water/fuel ratio versus the actual speed of the turbine corrected for inlet temperature for varying loads illustrating a correlation between corrected gas turbine speed and the required water/fuel ratio to maintain the $NO_x$ at a substantially constant level;

DETAILED DESCRIPTION OF THE DRAWINGS

Figure 5:
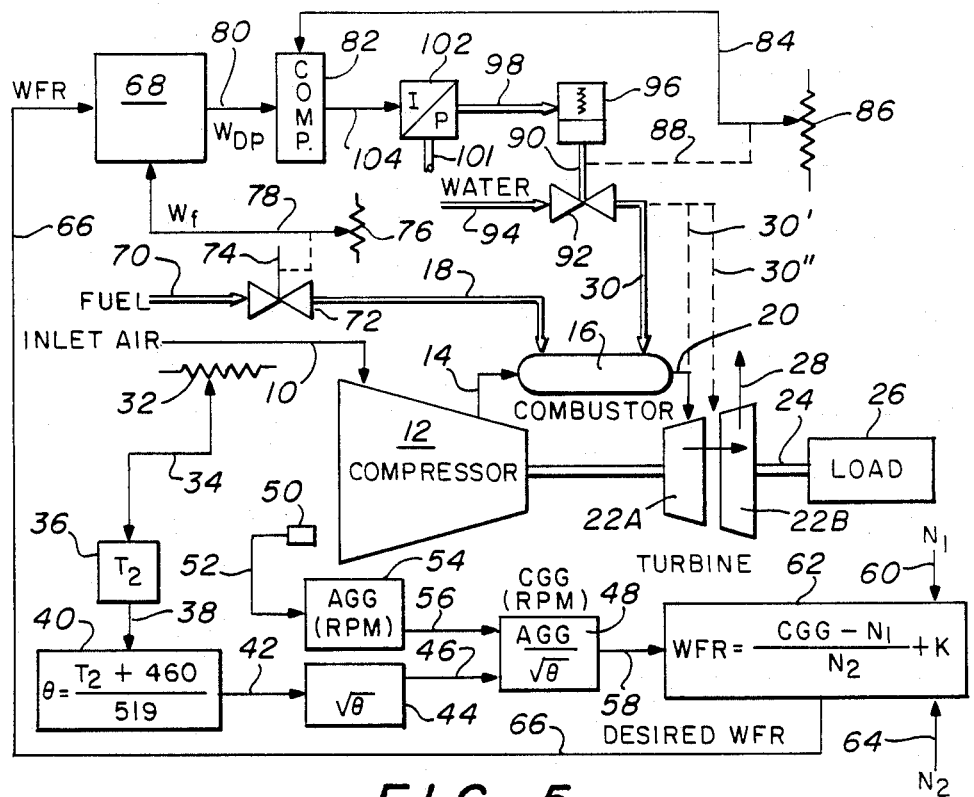
FIG. 5 is a basic schematic diagram of a gas turbine utilizing the present invention to control the water volume being injected into the combustor under varying inlet air temperatures, gas turbine speeds and loads.

FIG. 1 is a power transfer diagram of a prior art two-shaft turbine engine. Generally, the numeral 10 represents the inlet air path into compressor 12 where the air is compressed and then coupled through a conduit means 14 to a combustor 16. Fuel in conduit 18 is injected through a fuel metering valve (not shown) to maintain continuous burning. The compressed air is thus heated and the hot pressurized gas from the combustor 16 is coupled through conduit means 20 to turbine 22A where it expands while dropping in pressure and temperature as it drives the turbine 22B. In this way, the energy of the fuel is transformed into the rotating power of the turbine output shaft 24 which drives a load 26. The spent gases are exhausted at 28.

It is well-known that in this process, oxides of nitrogen ($NO_x$) result from the combustion processes. These $NO_x$ emissions can be either $NO_2$ or NO or a combination thereof. Because of the air pollution caused by the $NO_x$ emissions, stringent government requirements are placed on all power sources which produce these pollutants.

There are several factors which tend to decrease $NO_x$ emissions and one of them is the use of water injection in the combustion process. Water injection decreases the temperature of combustion and provides a diluting effect which decreases $NO_x$ emissions. Thus, as shown in FIG. 1, water may be injected on line 30 into combustor 16 along with the fuel in line 18 in an effort to diminish the $NO_x$ emissions.

However, the use of water on line 30 to decrease the $NO_x$ emissions is done in the prior art by the use of a manually controlled valve (not shown) which controls the amount of water entering the combustor 16 on line 30. The water/fuel ratio necessary to produce the minimum amount of $NO_x$ emissions has to vary in accordance with several factors. One of them is the inlet air temperature; another is turbine speed; and another is the load on the turbine. Obviously there is a wide range of loads on the turbine as well as varying ranges of both inlet air temperature and turbine speed. Thus it is impractical to manually control the amount of water on line 30 into the combustor 16 for constantly minimizing $NO_x$ emissions. The system as shown in FIG. 1 is thus normally designed for full horsepower operation and provides the proper $NO_x$ emissions at only that point. When other factors change or the load or shaft horsepower changes, the $NO_x$ emissions are no longer at the minimum standard. Thus, under all but the design operation, water is wasted and turbine efficiency is diminished.

FIG. 2 is a graph of water/fuel ratio versus temperature, $T_2$, which is the gas turbine compressor inlet temperature, $T_2$, for a shaft horsepower of 50%, 75%, and 100%. It will be noted in this graph that there is no correlation between the water/fuel ratio and the temperature, $T_2$, for the varying load levels in order to maintain the $NO_x$ emission at a substantially constant level.

In like manner, FIG. 3 is a graph of the water/fuel ratio versus temperature, $T_5$, the temperature of combustion gases between the two turbine stages. Again it can be seen that for shaft horsepower outputs of 50%, 75%, and 100%, in order to maintain the $NO_x$ emissions at a substantially constant level, no correlation exists between the water/fuel ratio and the temperature, $T_5$.

If however, the water/fuel ratio is plotted as shown in FIG. 4 versus the actual speed of the turbine corrected for inlet air temperature, there is a substantially linear correlation between the speed of the turbine and the required water/fuel ratio to maintain the $NO_x$ emissions at a substantially constant level (40 ppm for the graph shown). For other $NO_x$ levels the graph in FIG. 4 would change as shown by the lines indicated by 30 ppm and 50 ppm (parts per million) respectively. Thus, by determining the proper water/fuel ratio for the corrected speed of the turbine at any given horsepower, a substantially constant $NO_x$ emission level may be maintained. Knowing the actual volume of fuel being consumed by the turbine and the speed of the turbine corrected for inlet temperature, the correct volume of water needed for injection into the turbine to provide minimum $NO_x$ emission can be determined. This novel system automatically compensates for variations in the inlet air temperature, the turbine speed and the turbine load.

FIG. 5 is a schematic diagram of the novel system for automatically controlling the water injection in the turbine to maintain the proper water/fuel ratio for obtaining a substantially constant $NO_x$ emission from the turbine.

First, the proper water/fuel ratio must be calculated taking into consideration the temperature of the inlet air to the compressor and the actual turbine RPM as set forth in equation (1). Thus a temperature sensor 32 is placed in the inlet air stream 10 to determine the temperature thereof. Such a device may be a well-known resistance temperature device which produces an electrical signal on line 34 which represents the temperature of the inlet air. This signal is coupled to circuit 36 which, for instance, may be an analogue-to-digital converter which generates a digital signal on line 38 representing the air inlet temperature. This signal must be corrected to obtain a temperature correction factor, $\theta$, as is well-known in the art by adding the number 460 to the data representing the temperature, $T_2$, and dividing the sum by 519. This mathematical computation is accomplished in circuit 40.

$$\theta = \frac{T_2 + 460}{519} \quad (5)$$

The output of circuit 40 on line 42 is coupled to square root circuit 44 which generates an output signal on line 46 representing $\sqrt{\theta}$ and which is coupled as one input to RPM determining circuit 48.

The RPM of the compressor 12 is sensed in a well-known means by sensor 50 which generates an electrical signal on line 52 that represents the actual compressor speed (AGG) in RPM's. This analogue signal may also be transformed by an analogue-to-digital circuit 54 into a digital signal on line 56 which represents the actual gas generator RPM.

In order to determine a corrected gas generator speed or RPM, CGG, which takes into account the temperature of the inlet air, circuit 48, which is a divider circuit, divides the digital signal on line 56 representing actual gas generator RPM, AGG, by the square root of the temperature correction factor, to obtain a signal on line 58 representing the corrected gas generator RPM, CGG.

Since the gas turbine RPM has an effect on $NO_x$ emission levels, a minimum gas generator speed, $N_1$, must be corrected for the proper $NO_x$ level for a WFR=0.0 as is well-known in the art. By extending the line in FIG. 4 representing a 40 ppm $NO_x$ level, it crosses the abcissa at an RPM of CGG=13,000. Thus, in this example, $N_1$=13,000. A second generator speed, $N_2$, is determined by correcting the speed at a water/fuel ratio=1 and then subtracting the quantity $N_1$. Thus $N_2$=(corrected generator speed at WFR=1.0)−$N_1$. As can be seen in FIG. 4 at WFR=1, CGG=19,200. Thus $N_2$ =19,200−13,000=6,200 RPM in the example shown in FIG. 4 when K=0. The calculated value of $N_1$ may be entered on line 60 into the calculator circuit 62 while the calculated value of $N_2$ may be entered on line 64 in to the calculator circuit 62 in any well-known manner. Circuit 62 then determines the optimum water/fuel ratio for minimum $NO_x$ emissions at any given condition of inlet temperature, gas turbine RPM and load by subtracting the quantity $N_1$ from the corrected gas generator RPM, CGG, dividing the difference by $N_2$ and adding a constant, K. Thus, the algorithm solved by circuit 62 is $$WFR = \frac{CGG - N_1}{N_2} + K \quad (6)$$

The desired calculated water/fuel ratio, WFR, is then coupled as a signal on line 66 to water valve control circuit 68.

Since the desired water/fuel ratio is now known, one simply needs to determine the fuel quantity being injected in the turbine to determine the amount of water needed to be injected for that particular amount of fuel to obtain the proper water/fuel ratio. Thus the fuel on line 70 is coupled through a fuel metering valve 72 which can be adjusted from the open to the closed position by any well-known means 74 such as a hydraulic control. Coupled to the means 74 is a fuel valve position sensor 76 which may be, for instance, a resistor 76 having a wiper arm 78 which is moved with the opening and closing of valve 72 by means 74 thereby producing a signal on line 78 representing valve position.

The water control valve circuit 68 compares the calculated desired water/fuel ratio signal on line 66 with the signal on line 78 representing fuel valve position which is characterized for the actual volume of fuel being injected into the combustor, 134. A signal on line 80 is then generated which represents a desired water valve position to obtain the necessary volume of water for the particular amount of fuel being used to attain the necessary WFR. This signal on line 80 is coupled to a comparator 82 which also receives a signal on line 84 from a water valve position sensor 86 which is also coupled physically through connection 88 to the water valve control means 90. Since control means 90 is coupled to the water valve 92 and controls the movement of the valve 92 between the open and closed positions thereof, the water valve position sensor 86 is moved to generate a signal on line 84 representing the actual water valve 92 position.

Thus, water on line 94 passes through the water metering valve 92 in conduit 30 to the combustor 16 depending upon the position of water valve 92. The water valve control means 90 may be pneumatically driven in a well-known manner by unit 96 which receives pressure on line 98 from current to pneumatic transducer 102. Current to pneumatic transducer 102 is also a type well-known in the art which is electrically controlled to vary the amount of pressure delivered to conduit 98 from a source 101. The output of comparator 82 on line 04 produces the necessary signal to current-operated transducer 102 to cause the desired pressure from source 101 to be coupled on line 98 to the pneumatic actuator 96 which controls the position of water valve 92 through mechanical linkage 90. Thus it will be seen that with the circuit shown in FIG. 5, the proper water/fuel ratio is maintained with any change in RPM, variation in inlet temperature or load to cause the turbine 22A to produce substantially constant NO$_x$ emissions in exhaust 28.

Figure 6:
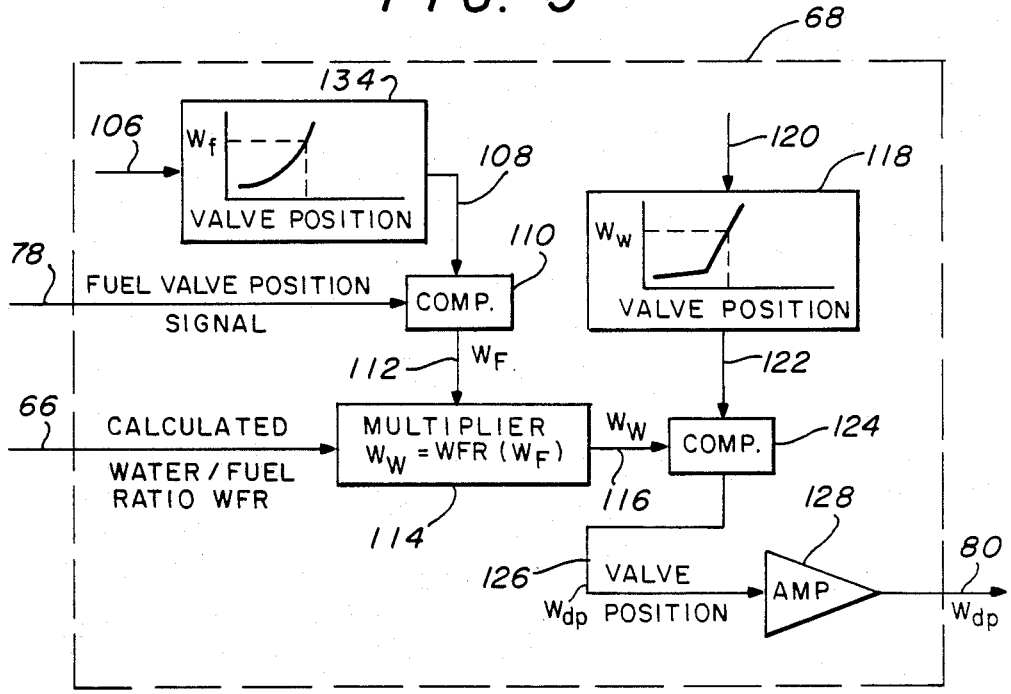
FIG. 6 is a detailed block diagram of the unit in FIG. 5 utilized to control the water metering valve position.

The water control valve circuit 68 in FIG. 5 is shown in detail in FIG. 6. It is well-known that the fuel metering valve 72 has a sensor 76 which generates an electrical output signal which is proportional to the fuel metering valve position. Since this relationship is known, circuit 134 in FIG. 6 may be a memory device which stores data representing the amount of fuel, W$_F$, being passed through the fuel valve 72 for any given valve position. This data may be entered into memory 134 on input line 106 through any well-known means such as keyboard or other well-known input device (not shown). The actual fuel valve position signal on line 78 from sensor 76 may then be compared by comparator 110 with the signal on 108 representing the known amount of fuel flow for any given valve positioned thus generating a signal on line 112 which indicates the actual fuel flow in pounds per hour injected into the combustor based upon the actual position of the fuel valve.

In addition, the calculated desired water/fuel ratio, WFR, as an electrical signal, appears on line 66 as shown in FIG. 5 and is also coupled to a multiplier circuit 114 along with the data representing actual fuel flow, W$_F$, from the comparator 110 on line 112. By multiplying the desired water/fuel ratio times the actual amount of fuel being passed through the fuel metering valve 72, $$\left(\frac{W_w}{W_F}\right) W_F,$$

an output signal on line 116 is developed which represents the desired water flow, W$_w$, for that particular fuel flow.

The signal on 116 is then used to control the water metering valve to obtain the proper amount of water flow desired. This is accomplished by storing in memory 118 data representing the amount of water flow in pounds per hour for any given position of the water metering valve 92 in FIG. 5. Since the relationship of water flow for any given valve position is established by the valve 92 as is also well-known in the art, that relationship data can be stored in memory 118 through line 120 by any well-known means such as a keyboard or other input device. Comparator 124 can then compare the output of memory 118 on line 122 with the desired value of water flow on line 116 to develop a signal on line 126 representing the desired water valve position, W$_p$, necessary to obtain the desired water flow volume to the combustor 16. This signal, W$_p$, on line 126 representing desired water valve position is amplified by amplifier 128 which produces an output signal, W$_{dp}$, on line 80 which, as shown in FIG. 5, is compared with a signal, W$_{ap}$, on line 84 representing the actual water valve position and thus develops a control signal on line 104 which causes the water meter valve 92 to be opened or closed as necessary to obtain the desired water flow on line 30 into combustor 16. When the actual water valve 92 position causes an output on line 84 from position sensor 86 which is equal to the desired position represented by the signal on line 80, the signal on line 104 is maintained and the valve 92 stops in the proper position.

Thus the circuit shown in FIG. 5 provides a gas generator speed which is corrected according to the inlet air temperature to obtain automatically an estimated water/fuel ratio necessary to maintain NO$_x$ emissions at a substantially constant level for any variation in inlet temperature, turbine RPM and change in load. Thus the novel device works for all horsepower levels, all ambient temperatures, all water/fuel ratios and all combustor temperatures. While the discussion of the invention included physical circuits for performing the necessary mathematical operations, the use of a computer to solve the algorithms and generate the necessary signals is contemplated herein.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined by the appended claims.

I claim:
1. A system for automatically maintaining substantially constant nitrogen oxide emissions from a gas turbine burning a gaseous or liquid fossil fuel injected through at least one fuel input valve by the use of variable quantities of water injected in the combustor through a water input valve, the system comprising:
   a. means for determining a corrected rotational speed, CGG, of said gas generator according to the formula

$$CGG = \frac{AGG}{\sqrt{\theta}} \quad (1)$$

where AGG=the actual rotational speed of said gas generator, $$\theta = \frac{T_2 + 460}{519},$$

the gas generator air inlet temperature correction factor, and $T_2$ =compressor inlet temperature, and b. means coupled to said determining means for automatically varying the water/fuel ratio, WFR, by changing the volume of water input through said water valve to said gas generator with variation in load, inlet temperature and turbine speed according to the formula $$WFR = \frac{CGG - N_1}{N_2} + K \quad (2)$$

where $N_1$=minimum corrected gas generator speed for WFR=0.0, $N_2$=(corrected gas generator speed for WFR=1.0)−$N_1$ and K=constant thereby maintaining a substantially constant emission of oxides of nitrogen from said gas turbine.

2. A system as in claim 1 wherein said means for determining said corrected speed, CGG, of said gas generator comprises:

a. a speed sensor coupled to said generator for generating a first electrical signal, AGG, proportional to the actual rotational speed of said gas generator, b. a temperature sensor associated with said gas generator air inlet for generating a second electrical signal, $T_2$, representing said air inlet temperature, c. means for receiving said signal, $T_2$, and generating a corrected inlet temperature electrical signal, $\theta$, according to the equation $$\theta = \frac{T_2 + 460}{519}, \quad (3)$$

d. means for receiving said corrected signal, $\theta$, and generating a third electrical signal representing $\sqrt{\theta}$, and e. means for receiving said first and third electrical signals, AGG and $\sqrt{\theta}$ and generating a fourth electrical signal, CGG, representing corrected gas generator rotational speed according to the equation $$CGG = \frac{AGG}{\sqrt{\theta}}. \quad (1)$$

3. A system as in claim 2 further comprising a. means for receiving said fourth electrical signal, CGG, and generating a fifth electrical signal representing a desired water/fuel ratio, WFR, where $$WFR = \frac{CGG - N_1}{N_2} + K \quad (2)$$

and wherein $N_1$=the minimum corrected gas generator speed for WFR=0.0, $N_2$=(corrected gas generator speed for WFR=1.0)−$N_1$, and K=constant, b. means for generating a sixth electrical signal, $W_F$, representing actual fuel flow in pounds per hour being admitted to said gas generator, and c. means for receiving said fifth and sixth electrical signals and generating a seventh electrical signal, $W_{dp}$, representing the desired position of said water valve and thus the desired amount of water to be admitted to said gas generator in pounds per hour.

4. A system as in claim 3 further comprising:

a. means for storing data representing actual water flow, $W_a$, in pounds per hour for a given water valve position, $W_p$, b. means for multiplying said fifth electrical signal, WFR, representing a desired water/fuel ratio times said sixth electrical signal, $W_F$, to obtain an eighth electrical signal, $W_w$, representing a desired water flow through said water input valve, c. means for comparing said eighth electrical signal, $W_w$, with said stored data representing actual water flow to generate a ninth electrical signal representing a desired water valve position, $W_p$, necessary to obtain said desired water flow, $W_w$, d. means for electrically controlling said water valve position, $W_p$, and e. means for coupling said ninth electrical signal to said water valve position electrical control means to set said water valve in said desired position, $W_{dp}$.

5. A system as in claim 4 wherein said means for generating said sixth electrical signal, $W_F$, representing said actual fuel flow in pounds per hour being admitted to said generator comprises:

a. means attached to said fuel flow valve for generating a tenth electrical signal representing actual fuel valve position, $W_f$, b. means for storing data representing fuel flow, $W_F$, in pounds per hour for a given fuel valve position, $W_f$, and c. means for comparing said tenth electrical signal, $W_f$, with said stored data to generate said sixth electrical signal, $W_F$, representing said fuel flow in pounds per hour for said actual fuel valve position, $W_f$.

6. A method for automatically maintaining substantially constant nitrogen oxide emissions from a gas turbine burning a gaseous or liquid fossil fuel injected through at least one fuel input valve by the use of variable quantities of water injected in the combustor through a water injected input valve, the method comprising the steps of:

a. determining a corrected rotational speed, CGG, of said gas generator according to the formula $$CGG = \frac{AGG}{\sqrt{\theta}} \quad (1)$$

where AGG=the actual rotational speed of said gas gas generator, $$\theta = \frac{T_2 + 460}{519},$$

the gas generator air temperature correction factor, and $T_2$=compressor inlet temperature, and b. automatically varying the water/fuel ratio, WFR, by changing the volume of water input to said gas generator with variation in load, inlet temperature and turbine speed according to the formula $$WFR = \frac{CGG - N_1}{N_2} + K \quad (2)$$

where $N_1$=minimum corrected gas generator speed for WFR=0.0, $N_2$=(corrected gas generator rotational speed for WFR=1.0)−$N_1$ and K=constant thereby maintaining a substantially constant emission of oxides of nitrogen from said gas turbine.

7. A method as in claim 6 wherein the step of determining said corrected speed, CGG, of said gas generator comprises the steps of:
   a. coupling a speed sensor to said generator for generating a first electrical signal, AGG, proportional to the actual rotational speed of said gas generator,
   b. associating a temperature sensor with said gas generator air inlet for generating a second electrical signal, $T_2$, representing said air inlet temperature,
   c. receiving said signal, $T_2$, and generating a corrected inlet temperature electrical signal, $\theta$, according to the equation $$\theta = \frac{T_2 + 460}{519}, \tag{3}$$

d. receiving said corrected signal, $\theta$, and generating a third electrical signal representing $\sqrt{\theta}$, and
   e. receiving said first and third electrical signals AGG $\sqrt{\theta}$ and generating a fourth electrical signal, CGG, representing corrected gas generator rotational speed according to the equation $$CGG = \frac{NGG}{\sqrt{\theta}}. \tag{1}$$

8. A method as in claim 7 further comprising the steps of:
   a. receiving said fourth electrical signal, CGG, and generating a fifth electrical signal representing a desired water/fuel ratio, WFR, where $$WFR = \frac{CGG - N_1}{N_2} + K \tag{2}$$

where $N_1$=the minimum corrected gas generator speed for WFR=0.0, and $N_2$=(corrected gas generator speed for WFR=1.0)−$N_1$, and K=constant, b. generating a sixth electrical signal, $W_F$, representing actual fuel flow in pounds per hour being admitted to said gas generator, and
   c. receiving said fifth and sixth electrical signals and generating a seventh electrical signal, $W_{dp}$, representing the desired position of said water valve and thus the desired amount of water to be admitted to said gas generator in pounds per hour.

9. A method as in claim 8 further comprising the steps of:
   a. storing data representing actual water flow, $W_a$, in pounds per hour for a given water valve position, $W_p$,
   b. multiplying said fifth electrical signal, WFR, representing a desired water/fuel ratio, times said sixth electrical signal, $W_F$, to obtain an eighth electrical signal, $W_w$, representing a desired water flow through said water input valve,
   c. comparing said eighth electrical signal, $W_w$, said stored data representing actual water flow to generate a ninth electrical signal representing a desired water valve position, $W_p$, necessary to obtain said desired water flow, $W_w$,
   d. electrically controlling said water valve position, $W_p$, and
   e. coupling said ninth electrical signal to said water valve position control to set said water valve in said desired position, $W_{dp}$.

10. A method as is claim 9 wherein the step of generating said sixth electrical signal, $W_F$, representing said actual fuel flow in pounds per hour being admitted to said generator comprises the steps of:
   a. attaching means to said fuel valve for generating a tenth electrical signal representing actual fuel valve position, $W_f$,
   b. storing data representing fuel flow, $W_F$, in pounds per hour for a given fuel position, $W_f$, and
   c. comparing said tenth electrical signal, $W_f$, with said stored data to generate said sixth electrical signal, $W_F$, representing said fuel flow in pounds per hour for said actual fuel valve position, $W_f$.

* * * * *